(12) United States Patent
Jerome (10) Patent No.: US 8,761,951 B2
(45) Date of Patent: Jun. 24, 2014

(54) PROMOTING GREEN INITIATIVES IN HOTELS

(71) Applicant: Six Continents Hotels, Inc., Atlanta, GA (US)

(72) Inventor: David Michael Jerome, Naples, FL (US)

(73) Assignee: Six Continents Hotels, Inc., Atlanta, GA (US)

( * ) Notice: Subject to any disclaimer, the term of this patent is extended or adjusted under 35 U.S.C. 154(b) by 0 days.

(21) Appl. No.: 13/728,601

(22) Filed: Dec. 27, 2012

(65) Prior Publication Data

US 2013/0117076 A1 May 9, 2013

Related U.S. Application Data (63) Continuation of application No. 12/565,247, filed on Sep. 23, 2009, now abandoned.

(60) Provisional application No. 61/194,020, filed on Sep. 23, 2008.

(51) Int. Cl.
*G05B 15/02* (2006.01)
*G05B 11/01* (2006.01)
*G06F 19/00* (2011.01)
*G05D 3/12* (2006.01)
*G06Q 10/00* (2012.01)
*G01R 15/00* (2006.01)

(52) U.S. Cl.
USPC .................. 700/295; 700/9; 700/17; 700/92; 700/286; 705/7.12; 702/186

(58) Field of Classification Search
CPC ............ G06Q 10/06; G06Q 10/06393; G06Q 50/163; G05B 19/2642; G05B 2219/23199; G05B 2219/25387; G05B 23/0229; G05B 23/0235; Y02B 70/3241; Y02B 70/343; Y02B 90/241; Y02B 90/246; Y02B 70/3225
USPC ......... 700/2, 9, 17, 28, 32, 33, 286, 291, 295; 705/7, 8, 10, 30, 34, 7.11, 341; 702/57, 702/127, 186, 187
See application file for complete search history.

(56) References Cited

U.S. PATENT DOCUMENTS

| | | | |
|---|---|---|---|
| 5,682,949 A | 11/1997 | Ratcliffe et al. | |
| 7,135,956 B2 | 11/2006 | Bartone et al. | |
| 2002/0178047 A1 | 11/2002 | Or et al. | |
| 2003/0050737 A1 | 3/2003 | Osann, Jr. | |
| 2006/0161450 A1* | 7/2006 | Carey et al. ....................... 705/1 |
| 2006/0230002 A1 | 10/2006 | Bennett et al. | |
| 2006/0241905 A1 | 10/2006 | McCalla | |
| 2007/0219841 A1 | 9/2007 | Fouquet | |

(Continued)

*Primary Examiner* — Kavita Padmanabhan
*Assistant Examiner* — Darrin Dunn
(74) *Attorney, Agent, or Firm* — Kilpatrick Townsend & Stockton LLP (57) ABSTRACT

The present invention provides systems and methods for allowing hotels (or any other organizations having one or more physical locations requiring various resources) to (1) measure their energy, water, waste and carbon emissions, (2) manage and control the elements of the hotel that impact the environment the most, and (3) report on the progress of the measurement, management and control, to the hotel owners, franchisors, franchisees and guests.

18 Claims, 10 Drawing Sheets

(56) References Cited

U.S. PATENT DOCUMENTS

| | | | |
|---|---|---|---|
| 2008/0216771 A1* | 9/2008 | Paine | 122/14.2 |
| 2008/0306985 A1 | 12/2008 | Murray et al. | |
| 2009/0119023 A1* | 5/2009 | Zimmer et al. | 702/22 |
| 2009/0307178 A1 | 12/2009 | Kuhns et al. | |
| 2009/0313056 A1 | 12/2009 | Beekhuis | |
| 2010/0249955 A1 | 9/2010 | Sitton | |
| 2011/0173109 A1 | 7/2011 | Synesiou et al. | |

* cited by examiner

PROMOTING GREEN INITIATIVES IN HOTELS

CROSS-REFERENCES TO RELATED APPLICATIONS

This application is a continuation of U.S. application Ser. No. 12/565,247, filed on Sep. 23, 2009, which claims priority to U.S. Provisional Application No. 61/194,020 filed Sep. 23, 2008, both of which are incorporated by reference in their entirety.

BRIEF SUMMARY OF THE INVENTION

Environmental responsibility has become increasingly important, including within the business world. The Earth's resources are limited, and failure to protect the environment can have lasting damage long-term. However, acting responsibly with respect to the environment can be difficult to achieve for companies and consumers, including in the travel industry, such as with respect to hotels.

Like other businesses, hotel operators make use of a variety of resources, including water, waste and energy (electricity, natural gas, etc.). While hotel owners, operators, franchisers and franchisees have incentives to reduce the amount of resources they use (through a reduced cost of using such resources), it's not always easy to make the most efficient use of these resources.

Accordingly, provided in the present specification are examples of systems and methods for allowing hotels (or any other organizations having one or more physical locations requiring various resources) to (1) measure their energy, water, waste and carbon emissions, (2) manage and control the elements of the hotel that impact the environment the most, and (3) report on the progress of the measurement, management and control, to the hotel owners, franchisors, franchisees and guests.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF THE INVENTION

Before the present methods and systems are disclosed and described, it is to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, an embodiment may include, for example only, from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the figures and their previous and following description.

As discussed previously, provided in the present specification are examples of systems and methods for allowing hotels (or any other organizations having one or more physical locations requiring various resources) to (1) measure their energy, water, waste and carbon emissions, (2) manage and control the elements of the hotel that impact the environment the most, and (3) report on the progress of the measurement, management and control, to the hotel owners, franchisors, franchisees and guests.

Figure 1:
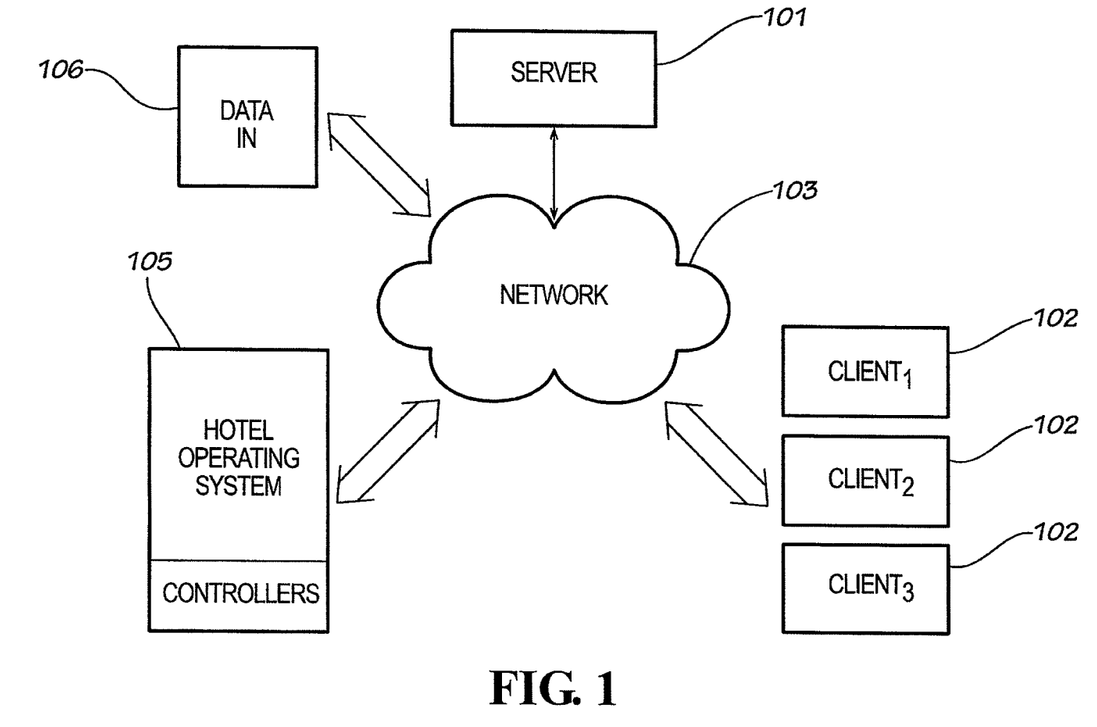
FIG. 1 is a block diagram depicting the overall architecture of the present invention, in one embodiment.

In one embodiment, the present invention may be implemented in conjunction with a computing platform, such as that shown in FIG. 1. A server 101 may comprise a computing device, including a processor, storage, input/output devices, and the like. One or more client computers 102 may be coupled to the server 101, through a network 103, such as the Internet, an intranet, or another type of suitable network. A hotel operating system 105 may be installed at the hotel, which may include one or more controllers, for controlling the supply of water or energy, or the disposal of waste. Data In 106 may be provided to the server 101 through the network 103, or directly to the server 101. Data 106 may be generated by one or more sensors located within the hotel, such as meter reading devices, and/or the like. How this data 106 is used by the server 101 will be described in further detail later.

Figure 2:
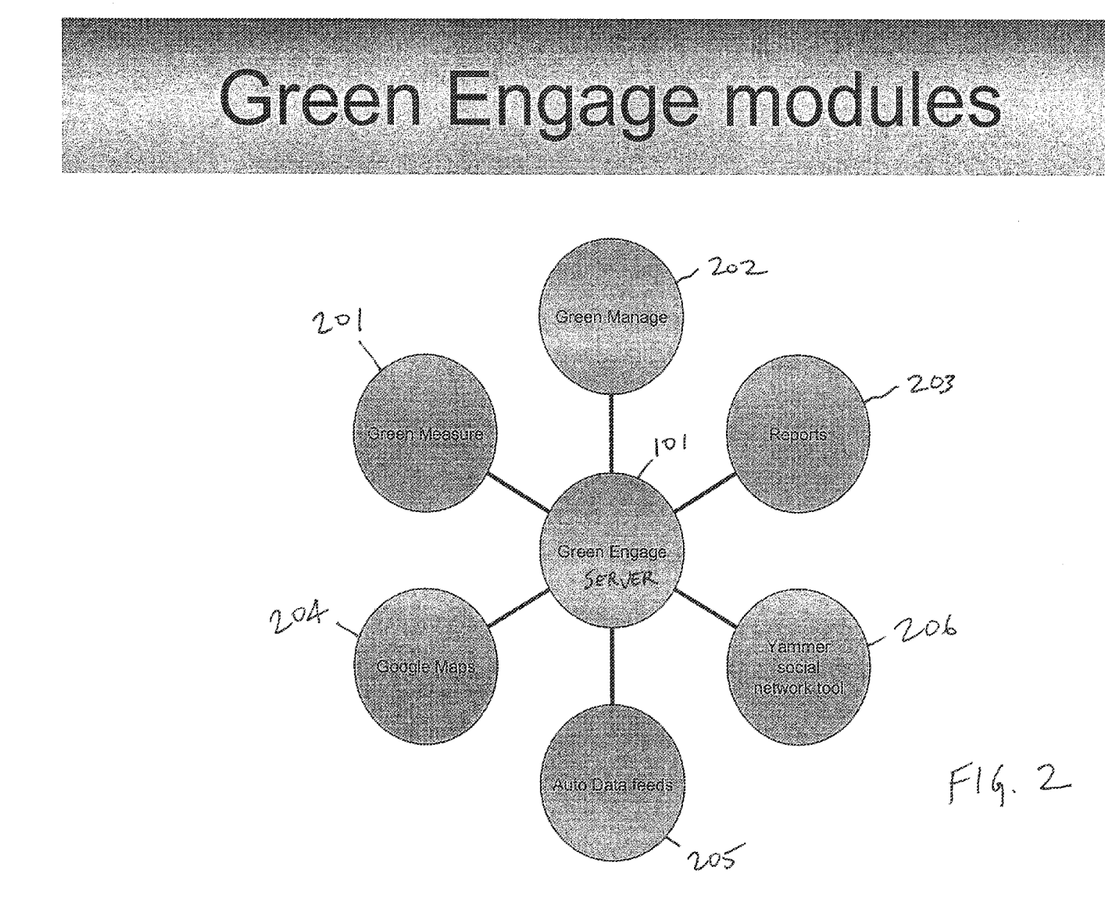
FIG. 2 depicts various modules that may be used within the present invention.

In one embodiment, the server 101 may be programmed with various modules to perform various functions, as depicted in FIG. 2. For example, the server may include a Measure module 201, a Manage module 202, and a Report module 203, as well as a Map module 204, an Auto Data Feed module 205, and a Social Network module 206. Each of these modules may be developed with any of a variety of software development platforms, such as Adobe Flex Builder 3, Java 2.0, Oracle 11 G, Hibernate, etc.

These modules, and how they interact with the other components of the present invention, will be described in further detail below, with respect to flow charts depicting the steps performed by the module, as well as screen shots showing an exemplary user interface that may, in one embodiment, be used by the module. The person of ordinary skill in the art will recognize that standard user interface techniques may be used, such as the graphical user interfaces utilized by operating systems such as Microsoft Windows, Mac OS, Linux, etc.

In one embodiment, the server 101 transmits the resulting data to one or more client computers 102. The server 101 and clients 102 may form a client/server relationship, whereby the client 102 executes a specialized program for receiving data from the server 101, processing same, displaying information to a user of the client 102, and receiving data input from the user and transmitting it and other data back to the server 101. Additionally, the server 101 may constitute a web server, with the client 102 executing a web browser for interacting with the web server 101.

Figure 3A:
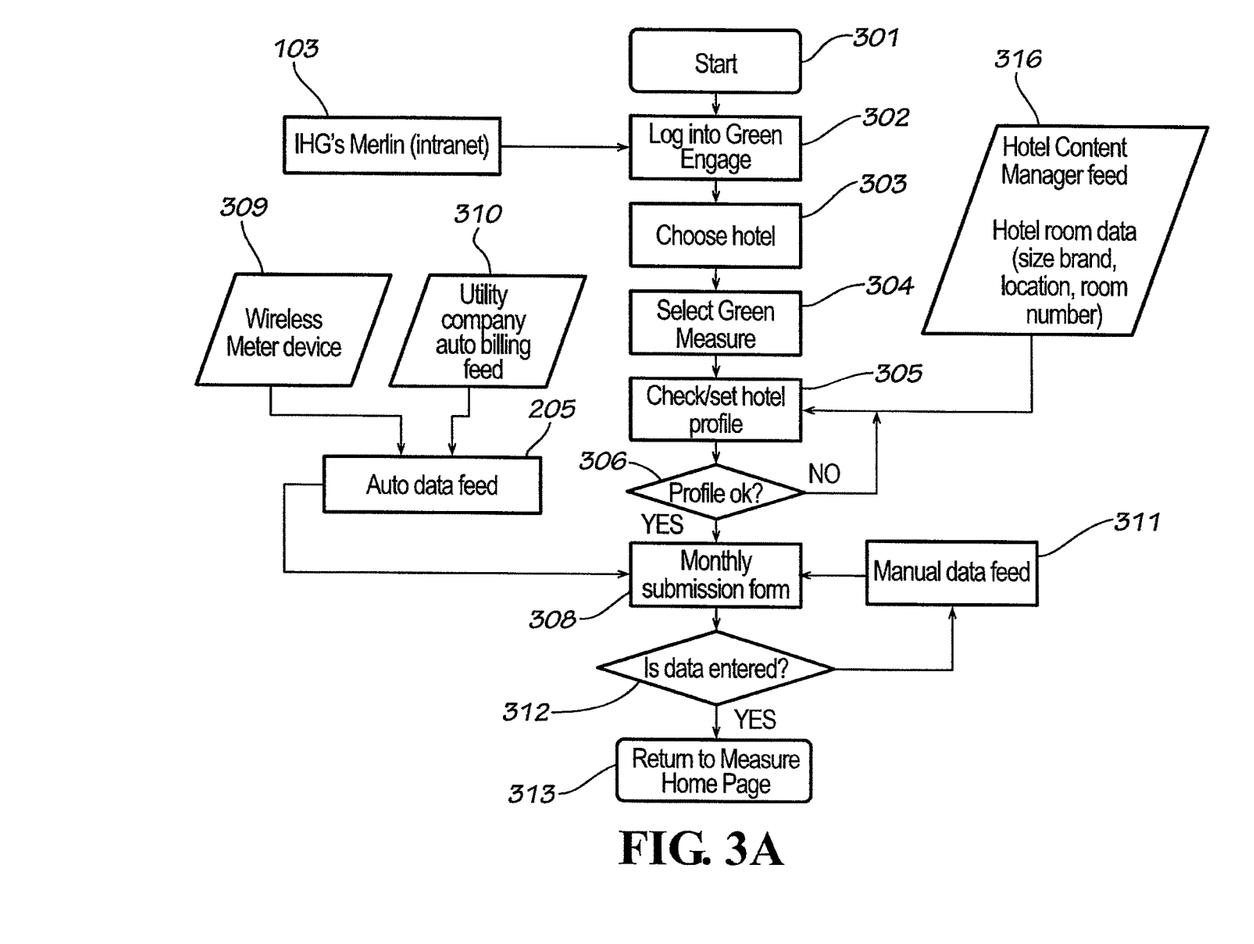
FIGS. 3A, 3B and 3C are flow diagrams and a sample screen shot depicting the measurement and management features of the present invention.
Figure 3B:
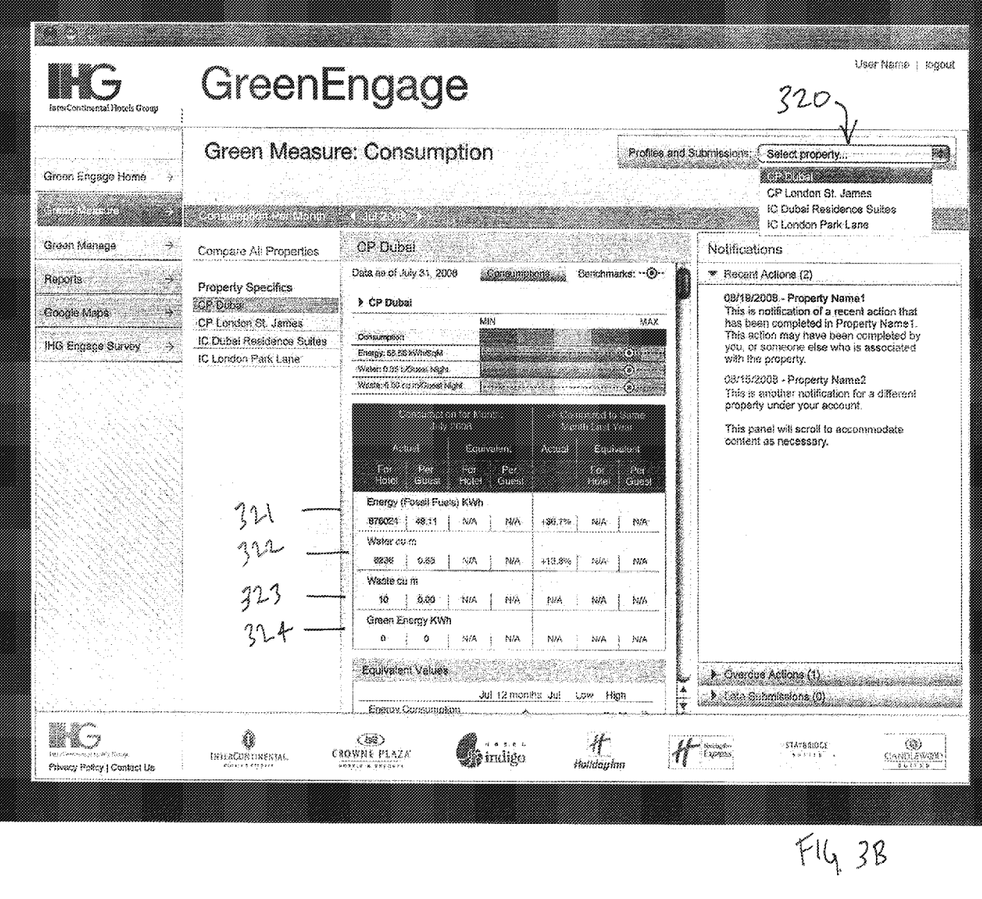

In one embodiment, the steps that the Measure module 201 may be programmed to perform are depicted in FIG. 3A. In step 301, the Measure module 201 starts, and this module allows a user to login at step 302 with appropriate credentials (UserID, password, or the like). In step 303, in the case where a user is tasked with managing multiple hotels, the user may choose one of the hotels from a list (such as a drop-down list). For example, using drop-down list 320 of FIG. 3B, a user may select one of the hotels in this case hotel "CP Dubai".

In step 304, a user may select the type of resource to measure. For example, referring back to FIG. 3B, the user may select Energy Fossil Fuel 321, Water 322, Waste 323 or Green Energy 324.

In step 305, the hotel profile may be checked/set. Specifically, details regarding the hotel may be fed to the server 101, from, for example, a hotel content manager 316. Such details may include hotel room data, including size of hotel rooms, brand of hotel, location of hotel, number of rooms, etc. In one embodiment, the hotel content manager 316 may provide geographical information, occupancy rates, and other suitable data to the server 101. In one embodiment, the hotel content manager 316 may comprise the Hotel 360 system, designed by Intercontinental Hotels Group as a single system that integrates separate systems into one. Other hotel companies may have similar systems that perform similar functionality.

Once the server 101 verifies that the data from the hotel content manager 316 has been received in step 306, data representing the usage of the various resources (water, waste, energy) is received by the server 101 (this supply of data to the server 101 is represented as Data In 106, in FIG. 1, as previously described). This usage data is received at step 308 via the auto data feed module 205. The auto data feed 205 may receive data from a variety of sources, such as from a wireless meter device 309, a utility company auto billing feed 310, or the like. The wireless meter device 309 may supply data to the server 101, as shown at 106 in FIG. 1.

The wireless meter device 309 may be one of a variety of such devices. For example, in one embodiment it may comprise model number WEM-MX or WEPM from Energy Tracking, LLC (www.energytracking com). Any other suitable device may also be used, depending upon the type of meter needed, the utility being metered, etc.

The auto billing feed 310 may be provided by an energy provider (provider of electricity, etc.), and may feed billing and other data directly to the server 101 of the present invention. Such auto billing feed 310 systems are available from various sources, such as from Inenco of Lancashire, U.K (www.inenco.com). Data may also be provided in a variety of formats, such as XML data feeds, Excel spreadsheets, etc. Additionally, a user of the server 101 may manually input usage data into the server 101 in step 311, corresponding to the amount of water, waste and/or energy used, the cost of same, etc.

In step 312, the server 101 verifies that the data has been entered, and if so, the Measure module 201 ends, and the server 101 returns to a home page in step 313.

Figure 3C:
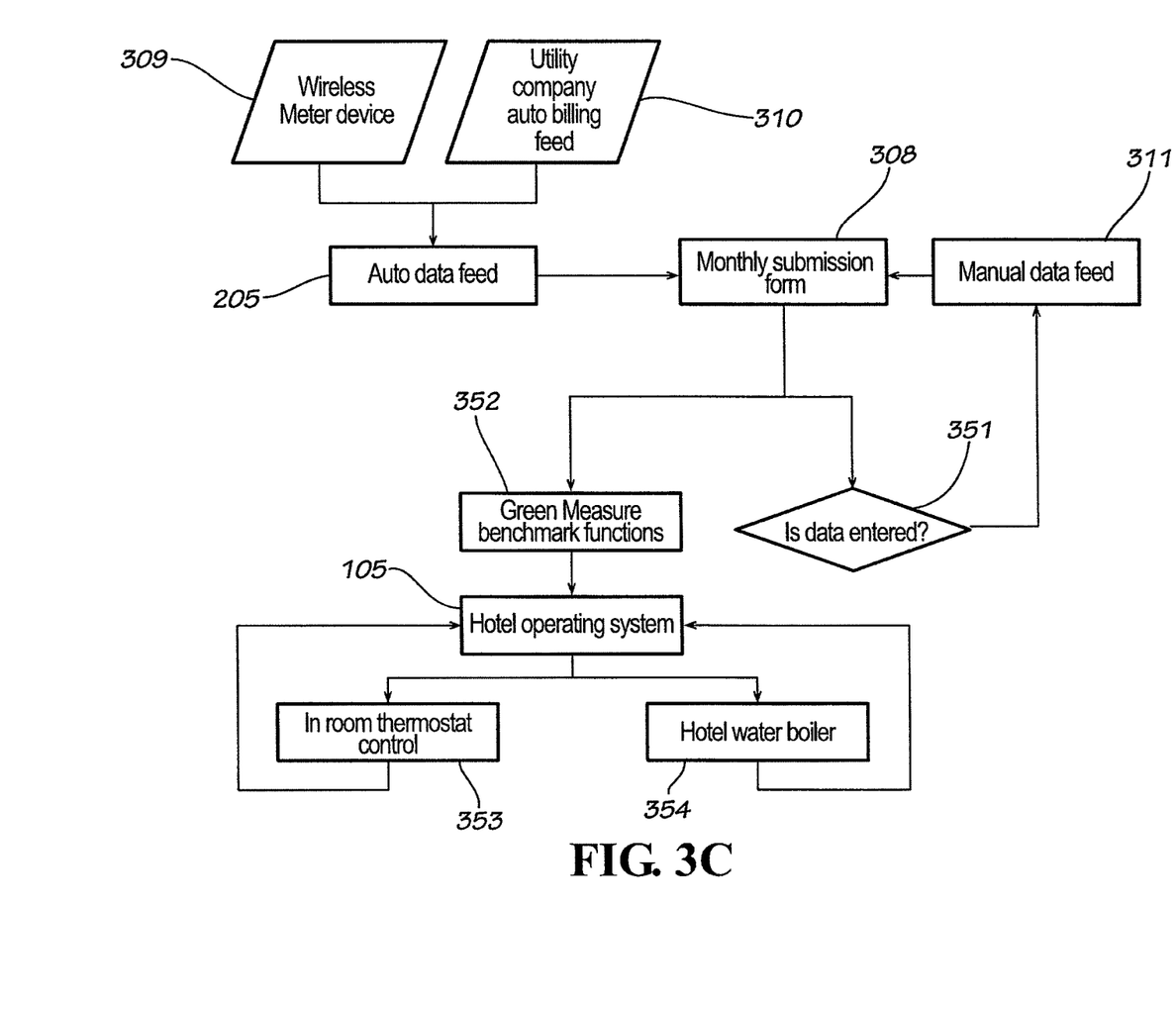

FIG. 3C depicts a sample process performed by the Measure module 201 and the Manage module 202, in order to effectuate a feedback control function. As described previously with respect to FIGS. 1 and 3A, the auto data feed 205 receives data from a wireless meter device 309 and/or a auto billing feed 310 (such as from a utility company). The auto data feed 205 provides this data to the monthly submission form 308. In step 351, if data hasn't been provided to the monthly submission form 308 automatically, the monthly submission form 308 may also receive data manually from a user at step 311.

In step 352, benchmark functions are selected. The hotel operating system 105 thereafter may automatically control various devices (such as an in room thermostat control 353, a hotel water boiler 354, etc.), based upon the results of the benchmark. For example, if after automatically obtaining thermostatic data from hotel rooms (309) and/or obtaining energy bills from an electric power utility (310), it is determined that the hotel's electricity costs associated with maintaining an air conditioning system are above a particular norm, the server 101 may instruct the hotel operating system 105 (or the hotel operating system 105 on its own) may readjust the deadband of the in room thermostats, so as to modify the guests' abilities to adjust the temperature, within a certain range. Likewise, based upon similar benchmark data, the server 101 and/or the hotel operating system 105 may modify the temperature of the hotel water boiler (354), in case the water heating costs are above a specified benchmark.

Figure 4A:
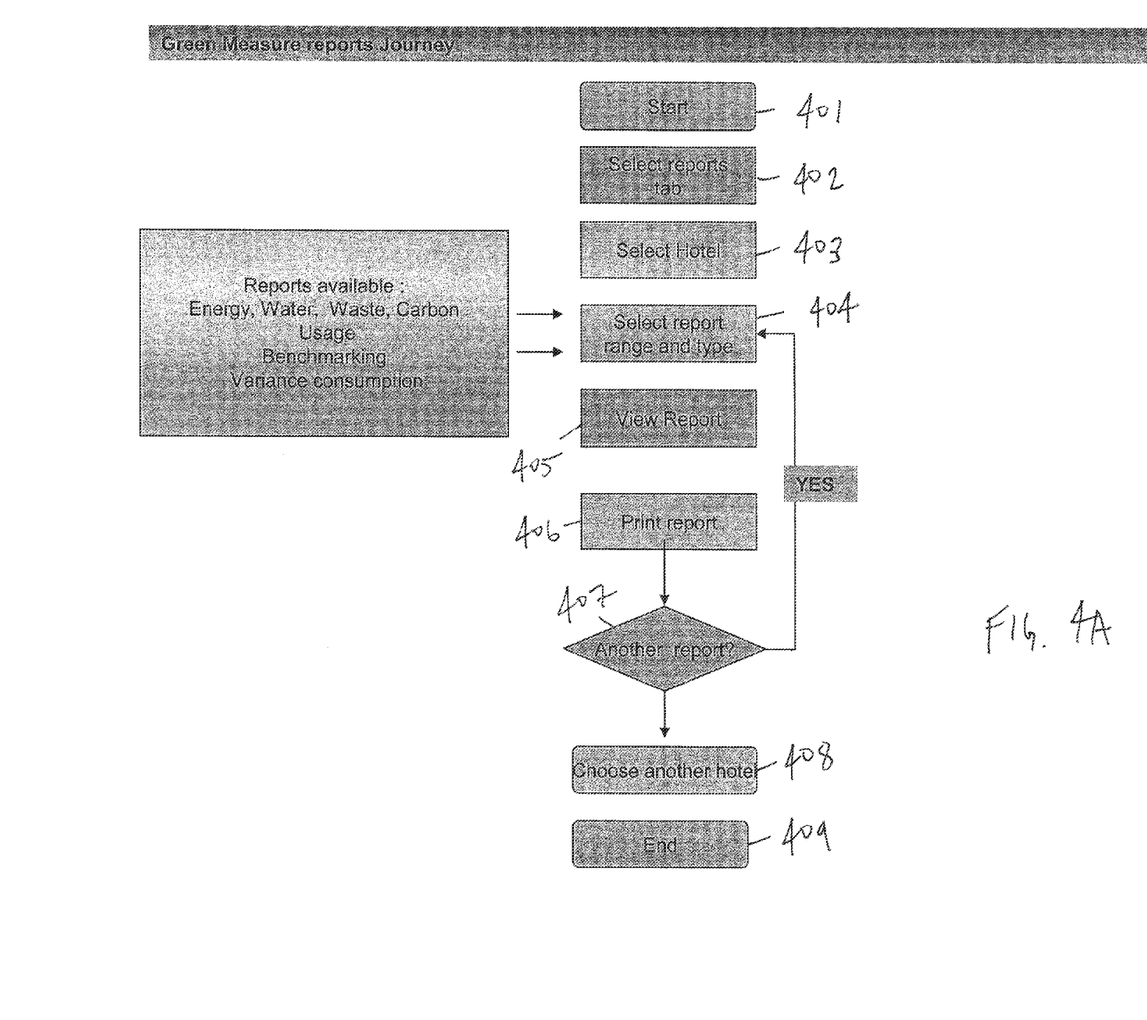
FIGS. 4A, 4B and 4C are flow diagrams and sample screen shots depicting the reporting features of the present invention.
Figure 4B:
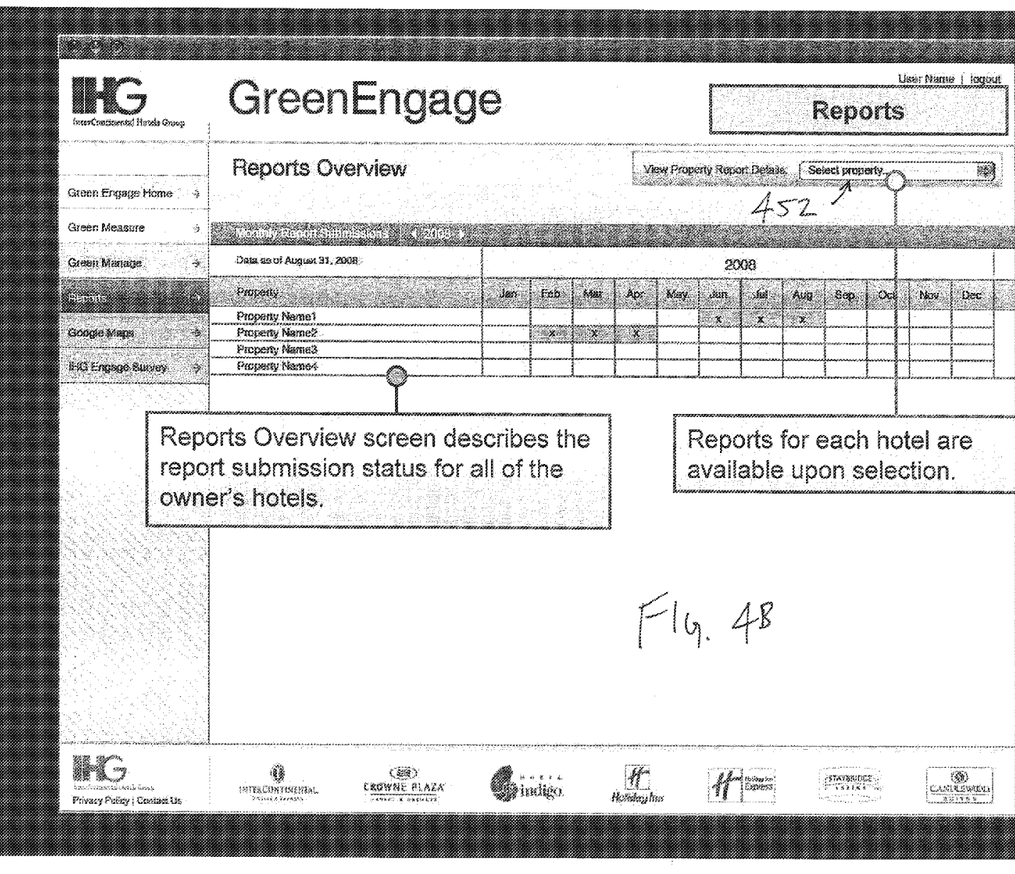
Figure 4C:
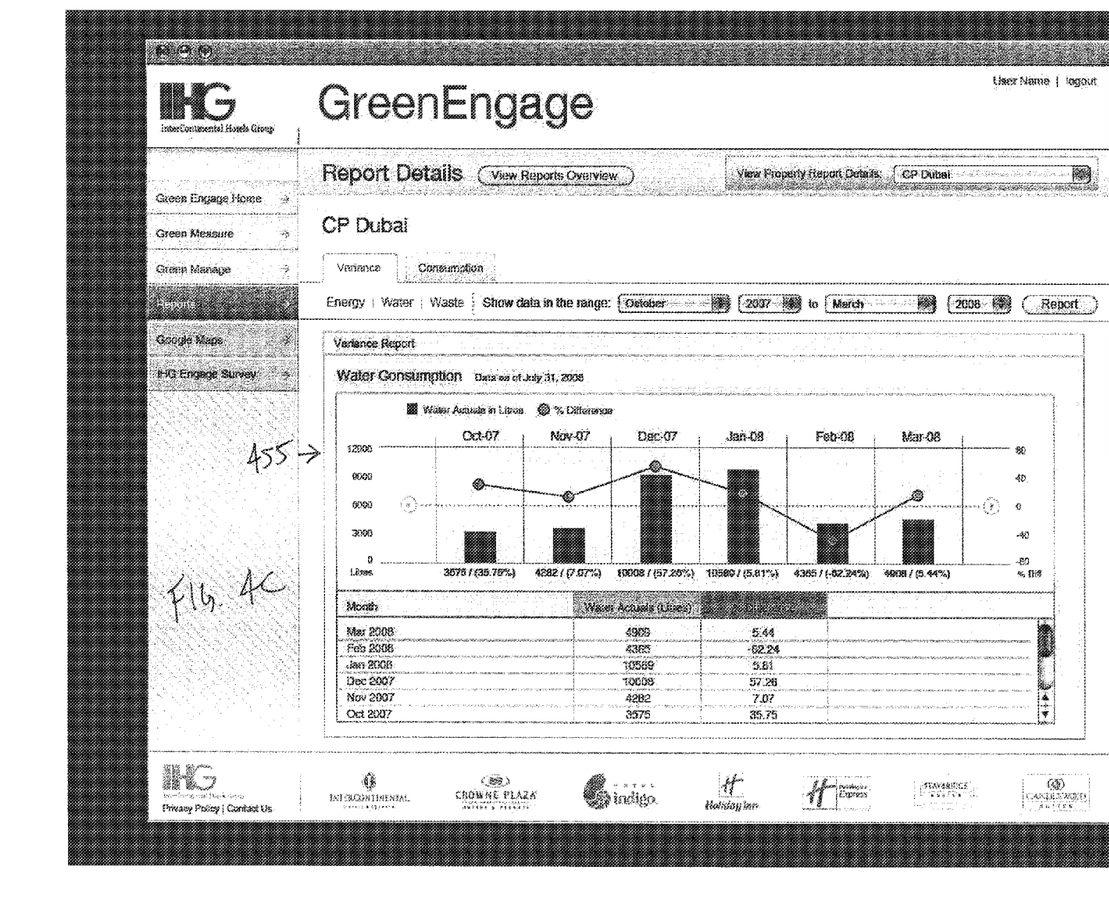

FIG. 4A depicts the Report module 203. In steps 401-402, the module 203 begins when the user selects the reports tab, such as tab 451 of FIG. 4B. In step 403, the user may select a hotel, such as via the drop-down list of 452 (FIG. 4B). In step 404, the user selects a report range and type. Examples of reports that may be available include: energy, water, waste, carbon usage, benchmarking and variance consumption. In step 405, the report may be viewed. FIG. 4C depicts an example report, showing water consumption 455 for a hotel over a period of time, with the percentage variance from room, occupancy level, square footage, last year's consumption and against other hotels. If the user so wishes, the report may also be printed on a printer in step 406.

In step 407, the user is asked whether another report is to be generated, and if so, then the process repeats at step 404. Otherwise, the user may choose another hotel in step 408, and if the user is finished with the report module, the module 203 ends in step 409.

Figure 5:
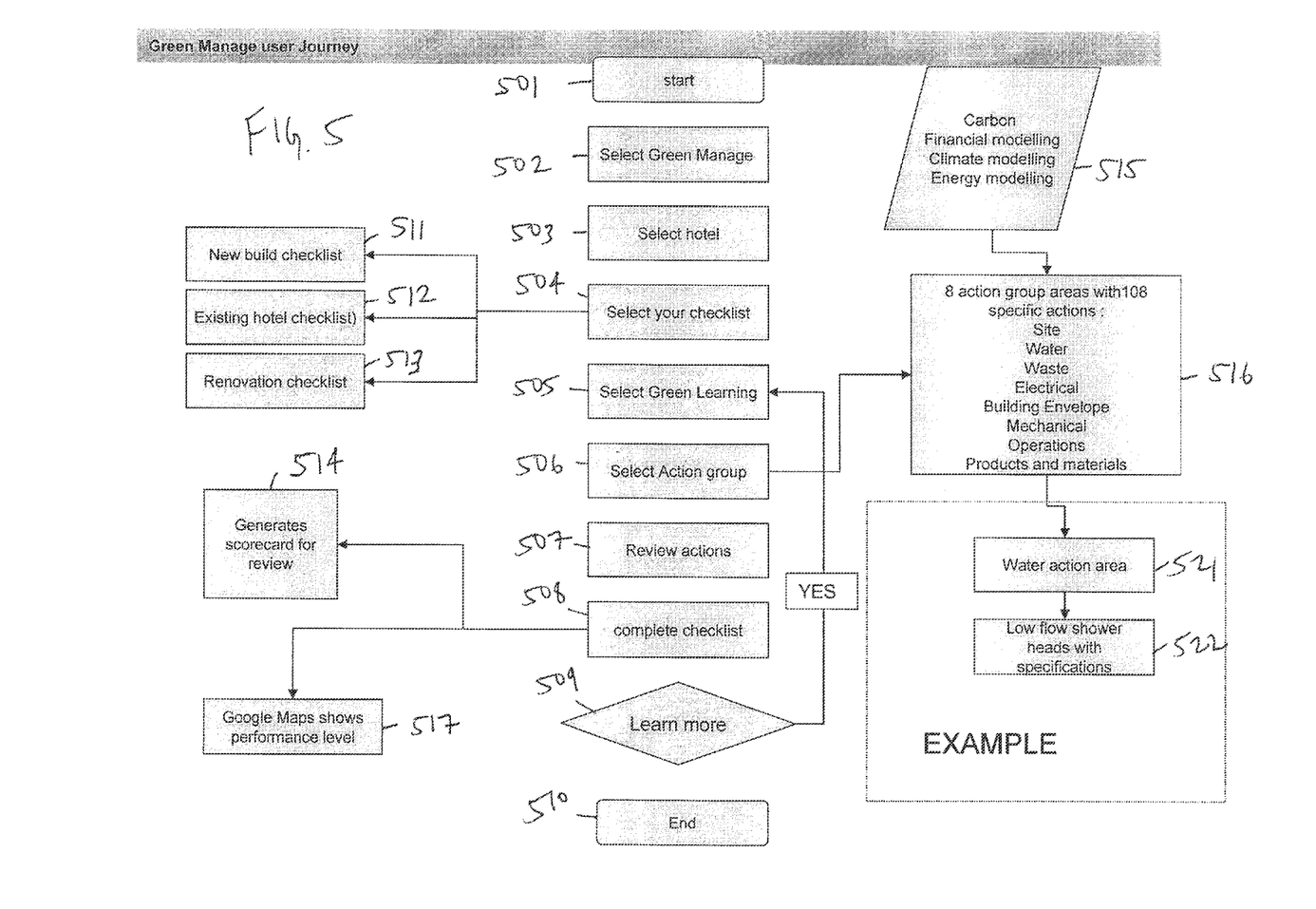
FIG. 5 is a flow diagram further depicting the management features of the present invention.

FIG. 5 depicts the Manage module 202. In steps 501-502, the module 202 begins. In step 503, the user may select a hotel, for example by using a drop-down list in the user interface (in the same way as a hotel was chosen at step 403 in FIG. 4B). In step 504, a checklist may be chosen for the selected hotel. Checklists may be in one of three categories—new build checklist for a new hotel (511), existing hotel checklist for an existing hotel (512), or renovation checklist for a renovation of an existing hotel (513).

In step 505, the user may be presented with learning opportunities regarding environmental/green initiatives, such as an overview of the importance of green initiatives, credit categories for green certification, assumptions for energy models, how global climate affects sustainable design, impact charts, and the like. In step 506, a user may select an action group, such as actions relating to site, water, waste, electrical, building envelope, mechanical, operations, and/or products and materials (step 516). Based on the results of step 516, specific action items may be generated, such as an action to take with respect to water usage (521), specifying the use of low flow shower heads, with specifications (522), etc.

Appendix A to the present patent application includes a comprehensive guide to sustainable building criteria, technologies and operational guidelines that may be used, in one embodiment, for hotels. Included in Appendix A are specific action items that may be taken with respect to steps 506 and 516, described above. For example, on page 12 of Appendix A, in Section W-4, an action item relating to the use of water efficient fixtures is provided. Other examples of other action items are also provided in this appendix.

In step 507, the actions may be reviewed, and the checklist completed in step 508. In step 517, a mapping system, such as Google Maps (Module 204, shown in FIG. 2), may be used to geographically show performance levels for various hotel properties. In step 514, a scorecard may be generated for review by the user. In step 509, the user may choose to learn about more, and return to step 505. If not, the module ends in step 510.

Figure 6:
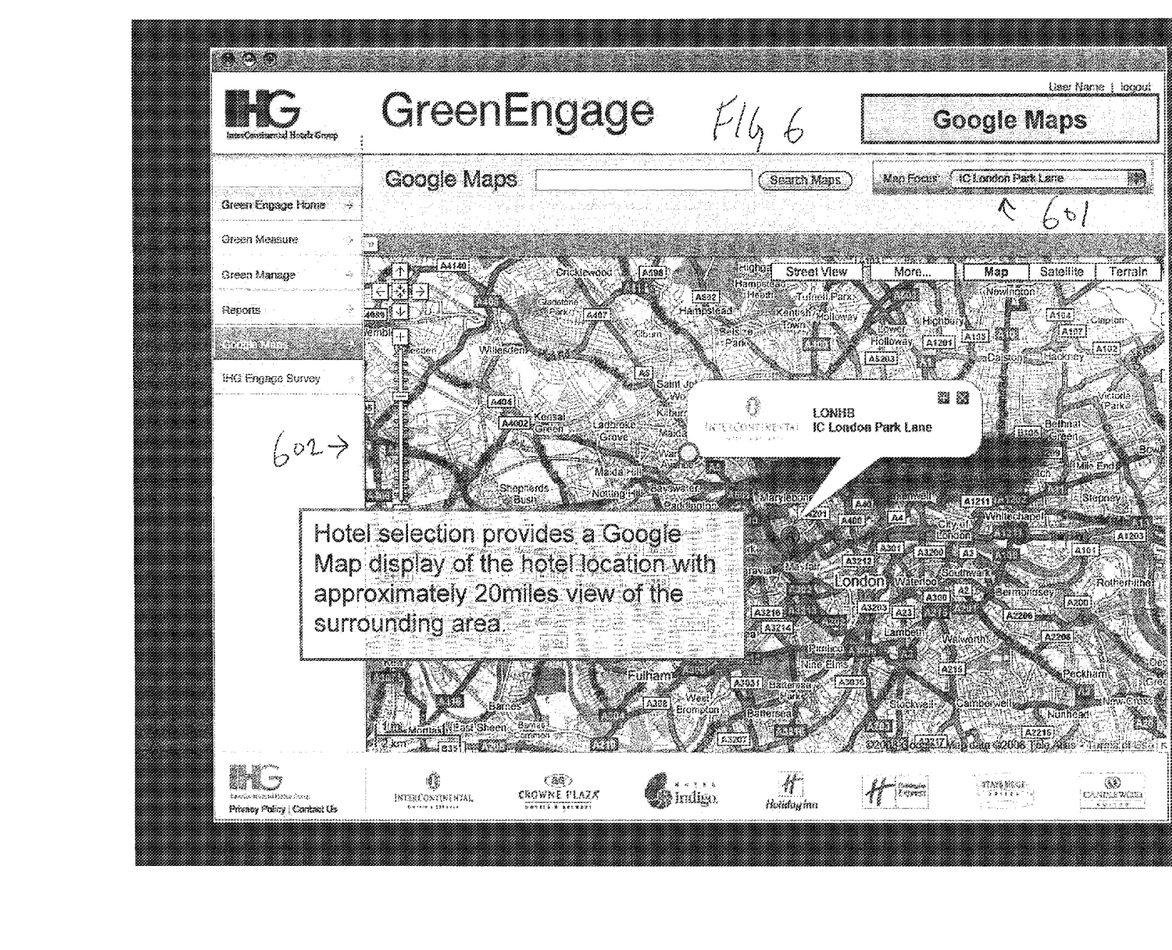
FIG. 6 is a screen shot depicting the mapping features of the present invention.

The other modules of the server 101 include Maps 204 and Social Network Tool 206. As depicted in FIG. 6, the Maps module 204 allows a user to select a hotel (reference 601 in FIG. 6), and a map 602 showing the location of the hotel is displayed, for example by using Google Maps, or another mapping system. As described previously in step 517 of FIG. 5, the Maps module 204 may also be used to show performance level of various hotels.

The Social Network Tool 206 may use a social networking system to allow interaction of users of the present invention. For example, in one embodiment, the Social Network Tool 206 may make use of Yammer, which is a microblogging service, to allow users to post updates of their activities, follow others' updates, tag content, and create concepts. Yammer focuses on businesses, and individuals with the same email domain can join a given network.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A computer-implemented method for implementing green initiatives within a selected hotel, a green initiative being a plan for reducing a negative environmental impact associated with operating hotels, comprising:

receiving, by a computer system, a selection of a hotel;

receiving, by the computer system, a selection of a resource of the hotel to be measured;

determining, by the computer system, usage data for the resource to be measured;

determining, by the computer system, a benchmark for analyzing the usage data using a profile of the hotel;

analyzing, by the computer system, the received usage data according to the benchmark;

providing, by the computer system, a recommended green initiative response using the analysis of the received usage data according to the benchmark, the green initiative response comprising an available group of actions for improving a performance level of the hotel;

receiving, by the computer system, a selection of an action from the available group of actions;

causing, by the computer system, the resource to implement the action;

determining, by the computer system, a checklist using a type of the hotel, the checklist identifying the performance level of the hotel and the available group of actions for improving the performance level, the checklist identifying a number of available points for each action in the group of actions using the type of the hotel and the performance level, wherein an earned point from the available points indicates an improvement to the performance level; and determining, by the computer system, a scorecard for the hotel using the checklist, points from the checklist, the usage data, the benchmark, and a planned implementation of the action by the resource.

2. A system for implementing a green initiative within a selected hotel, comprising:

(a) a hotel operating system comprising a controller, the controller configured to control a consumption of a resource corresponding to a utility service in a manner affecting an ability of a guest of a hotel to consume a portion of the resource;

(b) a sensor for measuring a usage of the utility service; and (c) a processor configured to:

(i) allow a user to select the hotel from a list of hotels;

(ii) allow the user to select the resource from a list of resources;

(iii) receive usage data from the sensor for the resource;

(iv) determine a profile of the hotel and determine, using the profile, a benchmark for analyzing the usage data;

(v) analyze the received usage data according to the benchmark;

(vi) provide a recommended green initiative response using the analysis of the received usage data according to the benchmark, the green initiative response comprising an available group of actions for improving a performance level of the hotel;

(vii) allow the user to select an action from the available group of actions;

(viii) cause the controller to implement the action by controlling the resource using the action;

(ix) determine a checklist using a type of the hotel, the checklist identifying the performance level of the hotel and the available group of actions for improving the performance level, the checklist identifying a number of available points for each action in the group of actions using the type of the hotel and the performance level, wherein an earned point from the available points indicates an improvement to the performance level;

(x) determine a scorecard for the hotel using the checklist, points from the checklist, the usage data, the benchmark, and a planned implementation of the action by the resource; and (xi) provide the scorecard to a computing device of the user.

3. A system for controlling resource usage within a selected hotel, comprising:

(a) a hotel operating system comprising a plurality of controllers, the plurality of controllers configured to control consumptions of a plurality of resources corresponding to a plurality of utility services in a manner affecting an ability of a guest of a hotel to consume one or more resources of the plurality of resources; and (b) a processor configured to:

(i) receive profile data for the hotel, the profile data comprising size of rooms in the hotel, brand of the hotel, location of the hotel, number of rooms in the hotel, and occupancy rates of the hotel;

(ii) receive usage data associated with the consumptions of the plurality of resources;

(iii) determine, using the profile data, a benchmark for analyzing the usage data;

(iv) analyze the usage data according to the benchmark to determine a green initiative response for the hotel, the analyzing comprising determining percentage variances from the consumptions of the plurality of resources across the rooms of the hotel, the occupancy rates of the hotel, the hotel over previous periods of time, the hotel over certification systems for establishing sustainability metrics, and other hotels;

(v) provide the recommended green initiative response for the hotel, the green initiative response comprising a group of actions for improving the consumptions of the plurality of resources of the hotel, the group of actions specifying a plurality of adjustments to the plurality of resources;

(vi) receive an authorization from a computing device of an administrator of the hotel to implement the group of actions;

(vii) implement the group of actions using the authorization, the implementation comprising causing the plurality of controllers to adjust the plurality of resources using the plurality of adjustments, the adjusted plurality of resources limiting the ability of the guest of the hotel to consume the one or more resources;

(viii) determine a checklist using a type of the hotel, the checklist identifying the performance level of the hotel and the available group of actions for improving the performance level, the checklist identifying a number of available points for each action in the group of actions using the type of the hotel and the performance level, wherein an earned point from the available points indicates an improvement to the performance level;

(ix) determine a scorecard for the hotel using the checklist, points from the checklist, the usage data, the benchmark, and the implementation of the group of actions; and (x) provide the scorecard to the computing device of the administrator of the hotel.

4. The computer-implemented method of claim 1 further comprising verifying profile data received from a server.

5. The computer-implemented method of claim 1 further comprising providing to a user learning opportunities regarding green initiatives.

6. The computer-implemented method of claim 1 further comprising assigning point values to each recommended green initiative response, wherein levels in a certification system are assigned according to the number of points accumulated.

7. A system for implementing a green initiative within a selected hotel, comprising:

(a) a hotel operating system comprising a controller, the controller configured to control a consumption of a resource corresponding to a utility service in a manner affecting an ability of a guest of a hotel to consume a portion of the resource;

(b) a sensor for measuring a usage of the utility service; and (c) a processor configured to:

(i) allow a user to select the hotel from a list of hotels;

(ii) allow the user to select the resource from a list of resources;

(iii) receive usage data from the sensor for the resource;

(iv) determine a profile of the hotel and determine, using the profile, a benchmark for analyzing the usage data;

(v) analyze the received usage data according to the benchmark;

(vi) provide a recommended green initiative response using the analysis of the received usage data according to the benchmark, the green initiative response comprising an available group of actions for improving a performance level of the hotel;

(vii) allow the user to select an action from the available group of actions;

(viii) cause the controller to implement the action by controlling the resource using the action;

(ix) determine a checklist using a type of the hotel;

(x) determine a scorecard for the hotel using the checklist, the usage data, the benchmark, and an implementation of the action by the resource; and (xi) provide the scorecard to a computing device of the user and to a computing device of the guest of the hotel.

8. The system of claim 7 wherein the one or more processors are further configured to set the benchmark value.

9. The system of claim 7 wherein the one or more processors are further configured to implement the recommended green initiative response.

10. The system of claim 7 wherein the one or more processors are further configured to verify profile data received from a server.

11. The system of claim 7 wherein the one or more processors are further configured to provide to a user learning opportunities regarding green initiatives.

12. The system of claim 7 wherein the one or more processors are further configured to assign point values to each recommended green initiative response, wherein levels in a certification system are assigned according to the number of points accumulated.

13. A system for controlling resource usage within a selected hotel, comprising:
   (a) a hotel operating system comprising a plurality of controllers, the plurality of controllers configured to control consumptions of a plurality of resources corresponding to a plurality of utility services in a manner affecting an ability of a guest of a hotel to consume one or more resources of the plurality of resources; and
   (b) a processor configured to:
      (i) receive profile data for the hotel, the profile data comprising size of rooms in the hotel, brand of the hotel, location of the hotel, number of rooms in the hotel, and occupancy rates of the hotel;
      (ii) receive usage data associated with the consumptions of the plurality of resources;
      (iii) determine, using the profile data, a benchmark for analyzing the usage data;
      (iv) analyze the usage data according to the benchmark to determine a green initiative response for the hotel, the analyzing comprising determining percentage variances from the consumptions of the plurality of resources across the rooms of the hotel, the occupancy rates of the hotel, the hotel over previous periods of time, the hotel over certification systems for establishing sustainability metrics, and other hotels;
      (v) provide the recommended green initiative response for the hotel, the green initiative response comprising a group of actions for improving the consumptions of the plurality of resources of the hotel, the group of actions specifying a plurality of adjustments to the plurality of resources;
      (vi) receive an authorization from a computing device of an administrator of the hotel to implement the group of actions;
      (vii) implement the group of actions using the authorization, the implementation comprising causing the plurality of controllers to adjust the plurality of resources using the plurality of adjustments, the adjusted plurality of resources limiting the ability of the guest of the hotel to consume the one or more resources;
      (viii) determine a checklist using a type of the hotel;
      (ix) determine a scorecard for the hotel using the checklist, the usage data, the benchmark, and the implementation of the group of actions; and
      (x) provide the scorecard to the computing device of the administrator of the hotel and to a computing device of the guest of the hotel.

14. The system of claim 13, wherein the sensor is selected from the group consisting of: a water meter, an electricity meter, a utility company billing feed, and a thermostat.

15. The system of claim 13, wherein the benchmark is based at least in part on an average consumption value of the selected utility service for target hotels, with characteristics determined using the profile data.

16. The system of claim 13, wherein:
   the hotel operating system includes multiple controllers, each being able to control the consumption of a resource for a different utility service; and
   the one or more processors are further configured to, for each of the multiple controllers, send a signal to adjust the guests' ability to individually consume a corresponding resource.

17. The system of claim 16, wherein at least one of the multiple controllers is operable to adjust multiple guests' ability to adjust thermostat settings for thermostats in corresponding rooms of the hotel.

18. The system of claim 16, wherein at least one of the multiple controllers is operable to adjust a boiler temperature.

* * * * *